United States Patent [19]

Thomas et al.

[11] 4,286,501

[45] Sep. 1, 1981

[54] SERVO BOOSTERS FOR VEHICLE BRAKING SYSTEMS

[75] Inventors: Alfred W. Thomas, Koblenz; Lutz E. A. op den Camp, Koblenz-Moselweiss, both of Fed. Rep. of Germany

[73] Assignee: Lucas Industries Limited, Birmingham, England

[21] Appl. No.: 55,484

[22] Filed: Jul. 6, 1979

[30] Foreign Application Priority Data

Jul. 8, 1978 [GB] United Kingdom ............... 29266/78

[51] Int. Cl.³ .......................... F15B 9/10; F16J 15/18
[52] U.S. Cl. ................................ 91/376 R; 91/369 A; 92/165 PR; 92/166
[58] Field of Search .............. 92/165 PR, 166, 165 R; 91/369 R, 369 A, 369 B, 376 R

[56] References Cited

U.S. PATENT DOCUMENTS

| | | | |
|---|---|---|---|
| 2,891,513 | 6/1959 | Fagge | 92/166 |
| 3,106,873 | 10/1963 | Cripe | 91/369 A |

FOREIGN PATENT DOCUMENTS

| | | | |
|---|---|---|---|
| 2306630 | 9/1974 | Fed. Rep. of Germany | 92/165 PR |
| 2519251 | 11/1976 | Fed. Rep. of Germany | 92/165 PR |

Primary Examiner—Paul E. Maslousky
Attorney, Agent, or Firm—Scrivener, Clarke, Scrivener and Johnson

[57] ABSTRACT

In a servo booster in which the rear part of the valve body is slidably guided in a guide in the rear end of the booster housing, the rear part and the guide have non-round cross-sections to prevent the valve body from turning relative to the housing. This is of particular benefit when a tie extends through the movable wall for transmitting braking reaction forces. Such a tie has to be sealed to the movable wall by a suitable seal, and any turning of the movable wall might damage the seal.

The interior of the valve body is of circular cross-section so that, due to the non-round external shape, a radially thickened portion of the valve body is formed to carry a fluid conduit.

4 Claims, 4 Drawing Figures

SERVO BOOSTERS FOR VEHICLE BRAKING SYSTEMS

SPECIFIC DESCRIPTION

This invention relates to a servo booster assembly for a vehicle braking system of the kind comprising a housing in which is located a movable wall for augmenting the force applied by a pedal-operated input member to an output member, the movable wall being secured to or integral with a valve body of a valve means controlling the differential pressure applied to the movable wall, the valve body having a part which is guided by guide means in the rear of the housing.

Usually the valve body part is of plain tubular shape and is slidably guided in a rearwardly extending tubular extension of the housing.

According to one aspect of the invention in a servo booster assembly of the kind set forth the guide means has a bore of non-round cross-section, and the outer surface of the valve body part is of non-round cross-section in a plane transverse to the direction of movement of the valve body relative to the housing so as to resist turning of the valve body and movable wall relative to the booster housing.

This aspect of the invention is particularly applicable to servo boosters of the kind disclosed in application Ser. No. 936,512, filed Aug. 24, 1978 and in British application No. 2009871A published June 20, 1979.

In Ser. No. 936,512 there is disclosed a servo booster for a vehicle brake system of the kind having at least two shells defining a housing, a diaphragm assembly comprising a diaphragm of elastomeric or other flexible material dividing the housing into at least two chambers and a support plate, and a control valve assembly, in which the housing is formed by lightweight shells coupled together by means of ties in the form of studs which pass through the diaphragm assembly and which enable said shells to be clamped together.

In published U.K. application No. 2,009,871A there is disclosed a modified construction in which the lightweight housing shells are coupled together by means of at least one stud.

In the constructions of those specifications the movable wall was proposed to be sealed to each tie by a sliding seal or by a diaphragm. When a booster is provided with one or more ties which extend through the movable wall at positions displaced from the axis of the booster then any turning of the movable wall and control valve assembly relative to the booster housing may result in serious damage to the sliding seal or diaphragm connection with the ties.

Thus, in accordance with a preferable feature of the first aspect of the invention a tie extends through the movable wall from a wall of the housing on one side of the movable wall to a further wall of the housing on the opposite side of the movable wall, the tie, at least where it passes through the movable wall, having its axis displaced from the longitudinal axis of the valve body portion, and means sealing the tie to the movable wall.

The bore of the guide means and the cross-section of the valve body part may be of polygonal shape but preferably they are of substantially elliptical shape, and the major axis of the ellipse preferably extends in a substantially vertical plane in use to provide maximum support against tilting of the movable wall.

Usually the valve body part of known booster assemblies of the kind set forth was of hollow cylindrical shape and the aperture in the housing was defined by a rearwardly extending tubular extension of the housing, a combined annular seal and guide assembly being located radially between the radially inner surface of the tubular housing extension and the radially outer surface of the valve body. A rubber boot was then secured between the outer surface of the tubular housing extension and the rear end of the valve body to assist in preventing dust from reaching the seal and guide assembly. It was necessary, however, for this boot to be perforated to accommodate the change in volume of the air trapped within the boot which occurs in use. Thus some dirt inevitably reached the seal and guide assembly and sometimes led to failure of the seal with consequent loss of differential pressure in the housing.

According to a second aspect of the invention in a servo booster assembly of the kind set forth the guide means comprises an integral part of the housing that engages directly with the outer surface of the valve body part, and the valve body part is sealed to the housing by a rolling diaphragm located rearwardly of the guide means and arranged to roll from an external surface of the valve body part to an internal surface of the housing on forward movement of the valve body relative to the housing.

The rolling diaphragm, in addition to effecting a seal of the rear chamber of the housing will also prevent dirt from contaminating the engaging surfaces.

With conventional boosters where the seal is a sliding seal with the outer surface of the valve body, it has been necessary to ensure that the valve body is provided with a high quality outer surface. When glass fibre-reinforced plastics are used there exists a great danger that glass fibres protruding through the valve body outer surface may damage the seal. When a plastics valve body has been used this has necessitated the use of expensive thermosetting plastics. The invention enables the use of thermoplastics materials for the valve body leading to a saving in weight. A moulded thermoplastics valve body will have a rougher surface than that of a termosetting plastics one, but this is an advantage for guiding purposes since grease is better retained on the valve body surface engaged by the housing.

Preferably the surface of the housing that engages with the valve body is provided with circumferentially spaced axially extending grooves to reduce friction forces resisting movement of the valve body.

Preferably the housing is formed of moulded plastics and said grooves are produced during moulding of the housing.

Preferably the valve body projects rearwardly of the housing in the retracted position of the valve body, and the rolling diaphragm is provided with a first peripheral bead which is secured over the rear end of the housing and with a second peripheral bead which is held within the rear end of the valve body by a retaining ring of C-shape in cross-section, the free end of one limb of the retaining ring having snap engagement in an internal annular recess spaced axially from the rear end of the valve body.

When the outer surface of the valve body part is non-round in cross-section in accordance with the first aspect of the invention and a rolling diaphragm is employed in accordance with the second aspect of the invention, an elliptical outer surface of the valve body part is preferable to a polygonal outer surface, since a rolling diaphragm is not suitable for use with polygonal surfaces.

The invention will now be further described by way of example only with reference to the accompanying drawing in which.

Figure 1:
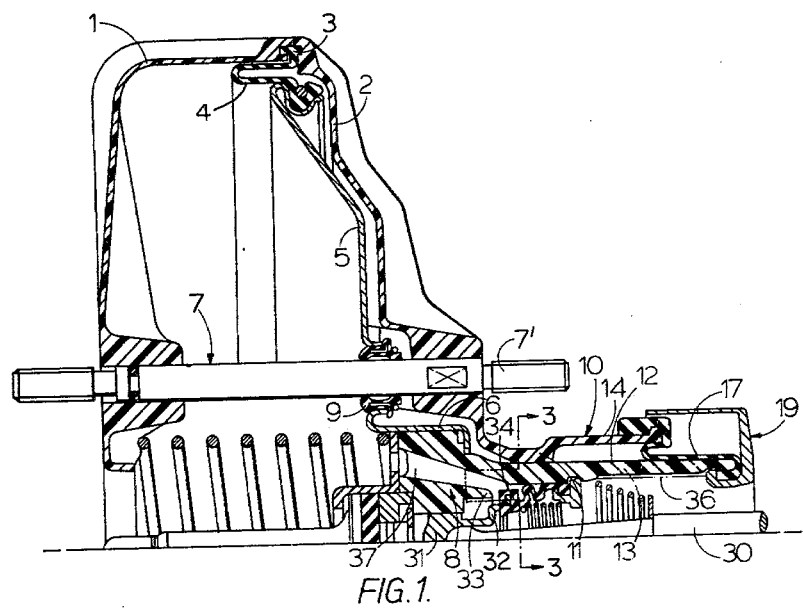
FIG. 1 is a longitudinal cross-section of a vacuum servo booster in accordance with the invention.

With reference to FIG. 1, the booster comprises a housing formed of moulded plastics shells 1 and 2 between the mating edges of which is held a peripheral bead 3 of a rolling diaphragm 4 secured to a metal diaphragm support plate 5. The plate 5 is provided with a rearwardly extending tubular portion 6 rigidly secured over the head of a tubular valve body 8 moulded from a thermoplastics material. A pair of diametrically opposed metal tie rods 7 extend axially through both shells 1 and 2 and through the diaphragm plate 5 which is sealed to the rods 7 by resilient sliding seals 9. The tie rods 7 transmit in use brake reaction forces from a master cylinder housing to which they are secured at their front ends to a vehicle bulkhead to which they are secured at their rear ends.

The housing shell 2 is provided with a rearwardly extending integral tubular extension 10 having a front portion 11 that engages directly with the outer surface 12 of the rear part 13 of the valve body to guide the valve body for axial sliding movement with the diaphragm support plate 5, and a rear portion 14 spaced radially from surface 12. The portion 11 constitutes a guide means for the valve body.

Figure 2:
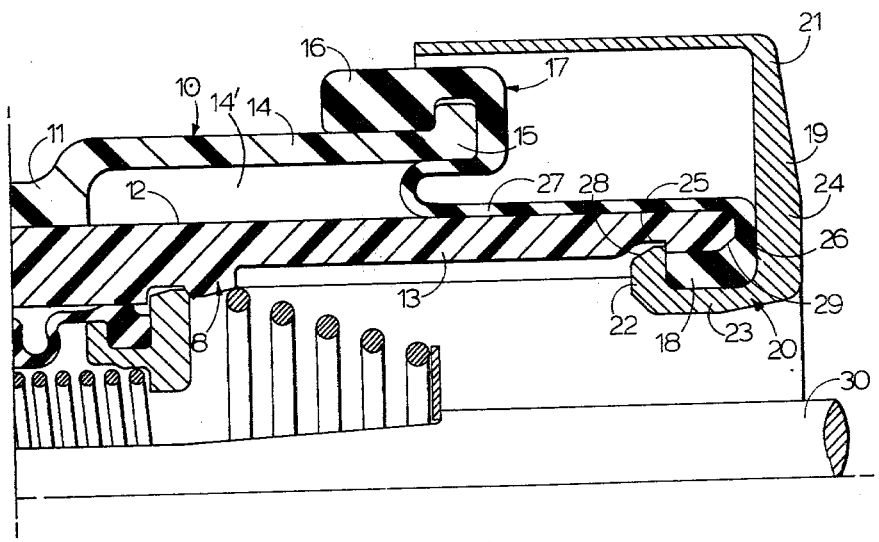
FIG. 2 is an enlarged view of the rear end of the booster of FIG. 1.

With reference to FIG. 2, the rear end of the portion 14 of the housing extension 10 is provided with a radially outwardly extending flange 15 which retains a first peripheral bead 16 of a rolling diaphragm 17, the bead 16 being under sufficient circumferential tension to form an effective seal with the housing extension 10. A second peripheral bead 18 is located within the rear end of the valve body 8 by a retaining member 19 which effectively comprises an annular ring 20 of C-shape in transverse cross-section. The ring portion 20 has limbs 22, 23 and 24, which are dimensioned such that the free end of limb 22 is a snap fit in an internal annular recess 25 in part 13 and such that the second bead 18 is held radially outwardly against part 13 with the adjacent portion 26 of the diaphragm held forwardly against the free end of part 25 to effect efficient seals therewith.

The intermediate portion 27 of the diaphragm rolls in use from the outer surface 12 of the valve body 8 to the elliptical inner surface of the rear portion 14 of the housing on forward movement of the valve body 8 relative to housing shell 2. The inner surface of rear part 14 may be of any suitable shape provided that it does not possess any discontinuity in its curvature.

The end of the limb 22 and that of the valve body are provided with chamfers 28 and 29 respectively to assist the assembly of the retaining member 19 to the valve body.

Referring again to FIG. 1, a pedal-operated input rod 30 engages at its front end with a valve control member 31 provided at its rear with a first annular valve seat 32 co-axial with a second annular valve seat 33 formed on the valve body, the valve seats 32 and 33 being engageable by an annular poppet valve member 34 in the usual manner.

Figure 3:
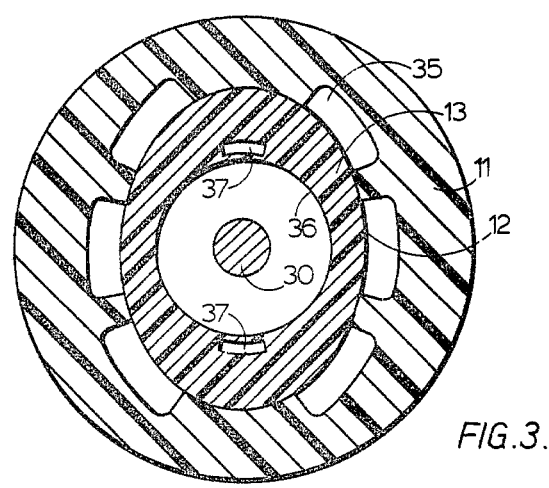
FIG. 3 is a cross-section substantially on the line 3—3 of FIG. 1, but omitting details of the poppet valve.

As shown in FIG. 3, the outer surface 12 of the part 13 of the valve body is of elliptical cross-section throughout its length, and the internal surface of the portion 11 of the housing extension 10 is of complementary shape except that the portion 11 is formed with a series of circumferentially spaced axially extending recesses 35 to reduce the area of contact between portion 11 and surface 12 and to vent the space 14' defined between rear portion 14, surface 12 and rolling diaphragm 17. The radially inner surface 36 of valve body portion 13 is of circular cross-section, and the major axis of the elliptical outer surface is vertical such that the thickened portions of the body part 13 are disposed at the top and bottom to provide maximum support against tilting of the diaphragm plate under its own weight and under the vertical force components exerted by the pedal linkage. The vacuum conduit channels 37 are also conveniently located in the thickened portions of body portion 13.

Figure 4:
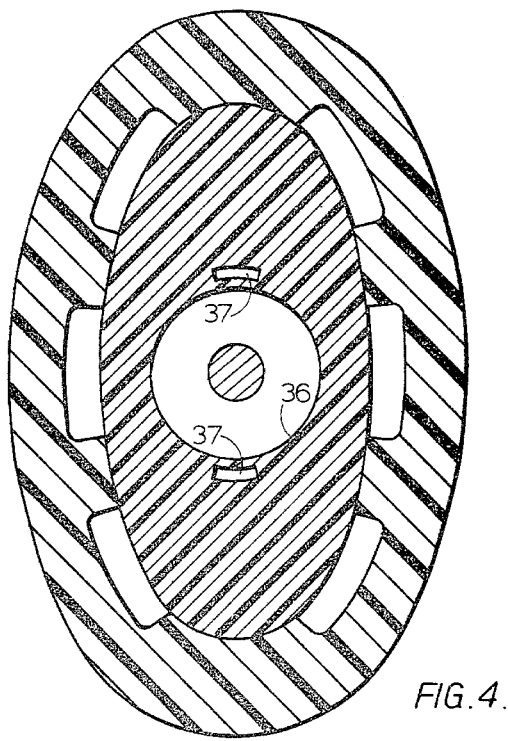
FIG. 4 is a view similar to FIG. 3 but of a modification.

In the modification of FIG. 4 the portion 11 of housing extension 10 has an elliptical outer surface rather than the round one of FIG. 3.

We claim:

1. A servo booster assembly for a vehicle braking system comprising a housing, a pedal-operated input member, an output member, a movable wall for augmenting the force applied by said input member to said output member, said movable wall dividing the interior of said housing into two chambers, valve means controlling the differential pressure of said chambers, a hollow valve body of said valve means, means connecting said valve body to said movable wall, a guide means located in the rear of said housing, a bore wall of said guide means defining a bore of non-round cross-section, a part of said valve body extending through said guide means, and said valve body, when viewed in cross-section on a plane which is perpendicular to the axis of said bore, comprising a radially inner surface of circular shape and a radially outer surface of non-round shape in non-rotatably sliding contact with said bore wall in said housing whereby said valve body is prevented from turning relative to said housing about said axis, said radially inner and outer surfaces of said valve body defining between them a radially thickened portion of said valve body, and a fluid conduit provided in said radially thickened portion and communicating with one of said chambers.

2. A servo booster assembly as claimed in claim 1 including first and second walls of said housing located on opposite sides of said movable wall, a tie extending through said movable wall from said first to said second walls, said tie having an axis which is displaced from said axis of said guide means at least where said tie passes through said movable wall, and means sealing said tie to said movable wall.

3. A servo booster as claimed in claim 1 wherein said bore of said guide means and said cross-section of said valve body part are of elliptical shape.

4. A servo booster as claimed in claim 1 wherein said guide means has a radially inner surface provided with recesses for reducing the area of contact between said guide means and said valve body part.